Dec. 1, 1964    J. F. ENGLE    3,159,053
POWER TRANSMISSION SYSTEMS
Filed June 20, 1962    3 Sheets-Sheet 1
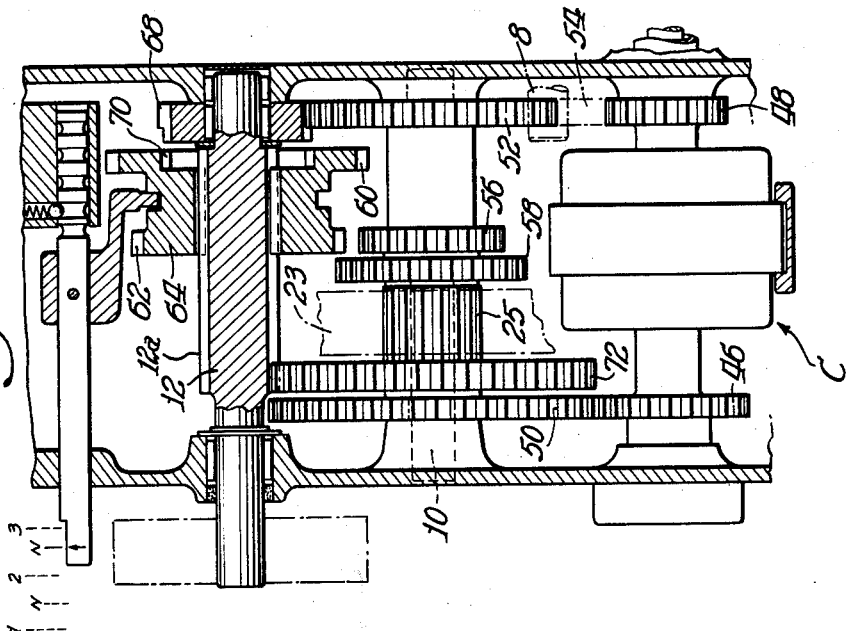
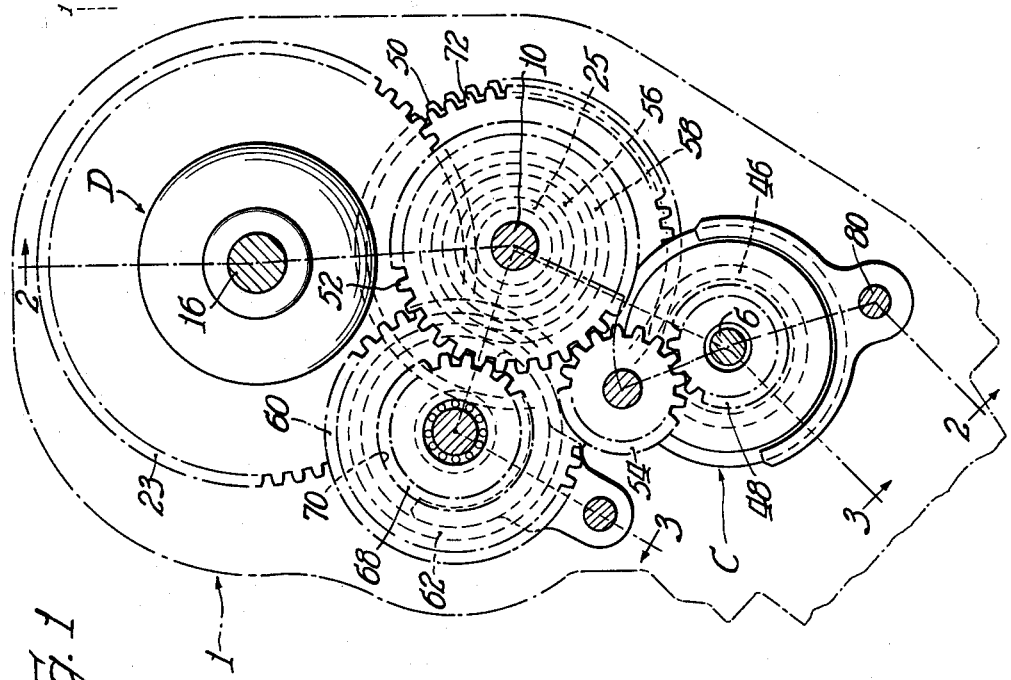
Inventor:
Jack F. Engle
By: Thomas B. Hunter  Atty.

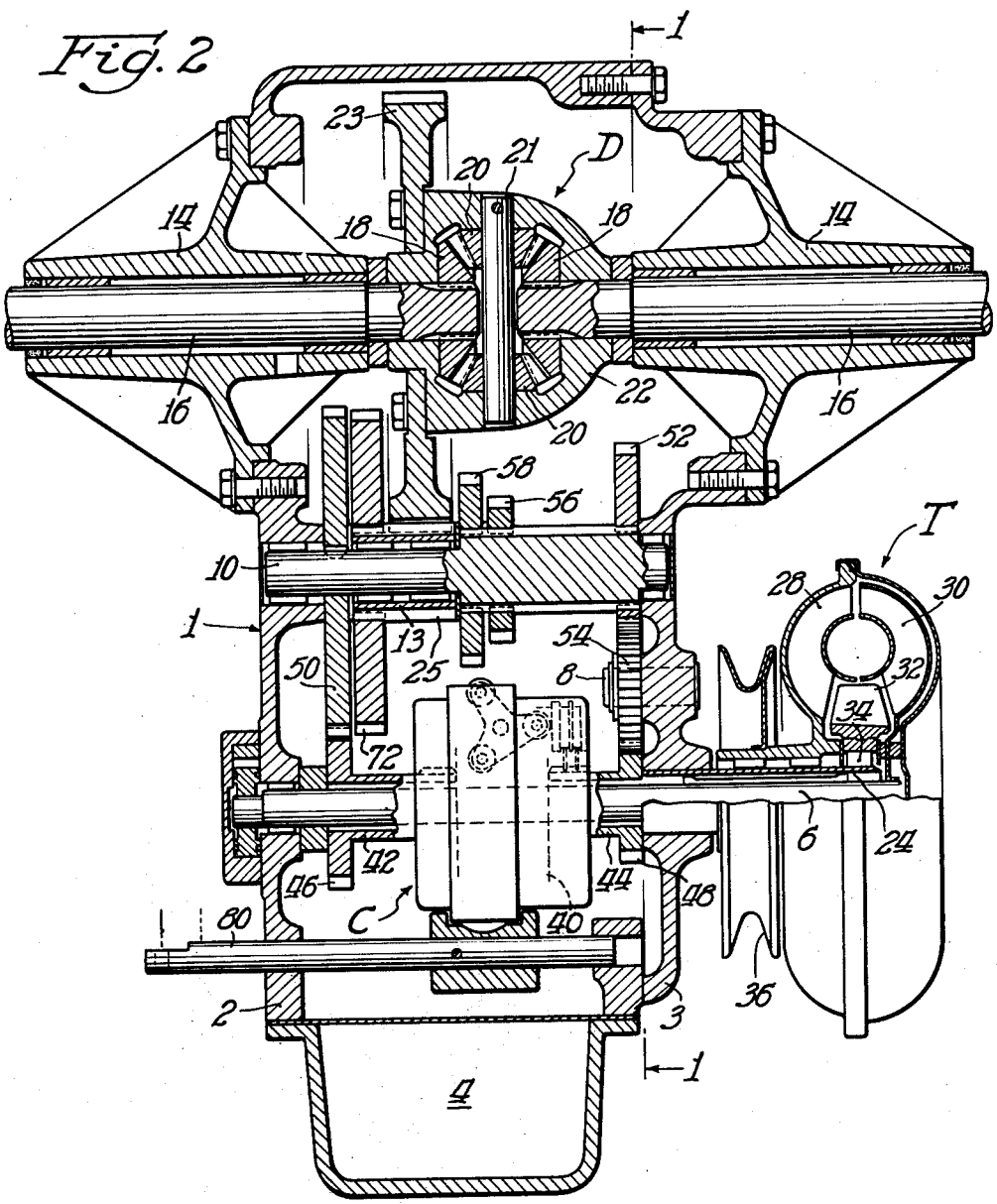

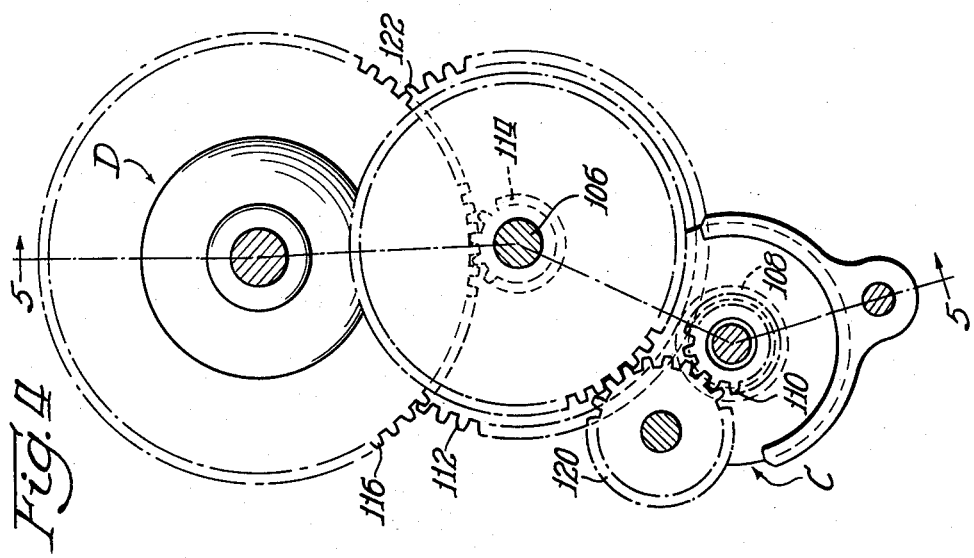
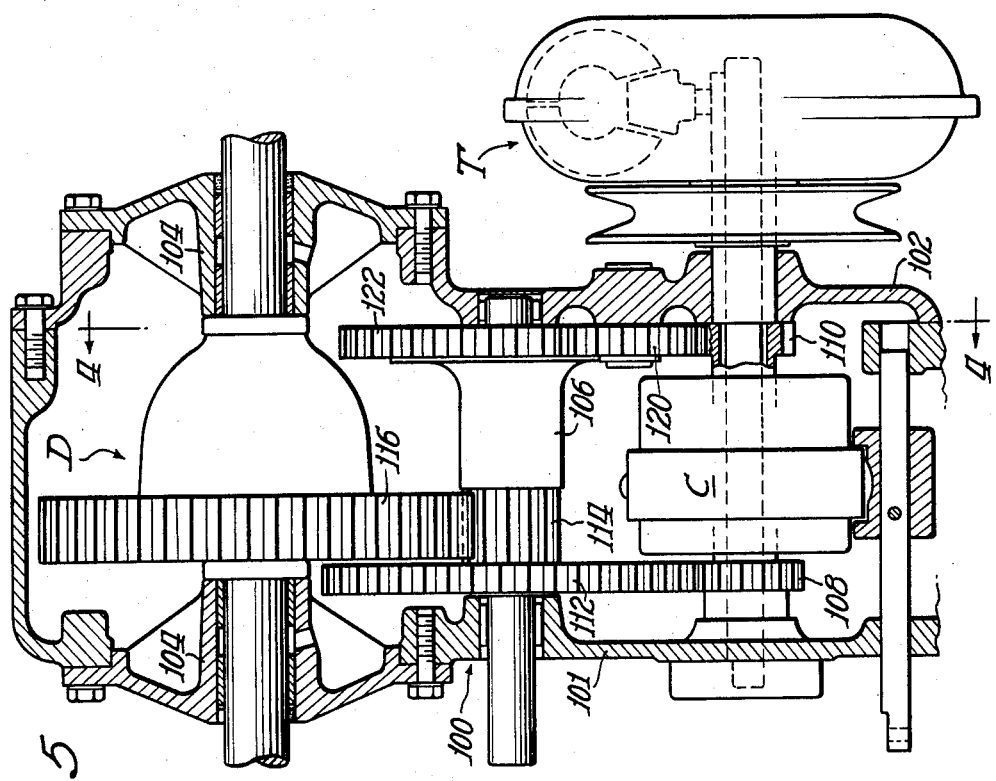

3,159,053
 ## POWER TRANSMISSION SYSTEMS
 Jack F. Engle, Auburn, Ind., assignor to Borg-Warner Corporation, Chicago, Ill., a corporation of Illinois
 Filed June 20, 1962, Ser. No. 203,797
 2 Claims. (Cl. 74—701)

This invention relates to power transmission systems, and more particularly to transmissions adapted for use with relatively low horsepower land vehicles such as garden tractors, for example.

The invention is particularly directed to power transmission systems including a two-way clutch which may be selectively energized in forward, neutral, and reverse positions, said clutch being capable of reversing the direction of the drive in an expeditious manner without shifting gears.

In a preferred embodiment of the invention, the drive system includes the combination of a drive member, a pair of gear trains, a two-way clutch driven by said drive member and adapted to selectively drive one or the other of said gear trains, one of said gear trains driving in a forward direction and the other in a reverse direction, and a differential mechanism for transmitting torque from said gear trains to the driving wheels. This system may include a multiple speed transmission which is capable of being selectively actuated to produce two or more different gear ratios; or it may comprise a direct driving system wherein the two-way clutch alternatively drives the differential mechanism through fixed ratio gear trains.

Numerous advantages over known prior art drive systems are obtained by the present invention. First of all, the shifting from forward to reverse is substantially instantaneous and requires no clutch-gear shift coordination. Single lever movements, forward and backward, permit smooth, jerk-free starts and directional changes even under power. It is also possible to work a small tractor powered by the present system right up to obstructions and then reverse direction with a simple lever movement. In a multispeed unit, forward and reverse are obtained in all gear ratios.

It is a principal object of the present invention to provide an improved transmission system which includes a plurality of independent drive trains adapted to be selectively operated through a clutch to obtain forward and reverse output iin a plurality of different gear ratios.

Other objects and advantages will appear from the following specification when read in conjunction with the annexed drawings wherein:

FIGURE 1 is an elevation view of a preferred embodiment of a transmission constructed in accordance with the principles of the invention, said view being partially schematic in form and taken along the plane of line 1—1 of FIGURE 2;

FIGURE 2 is a view, partly in section, taken along the plane of line 2—2 of FIGURE 1;

FIGURE 3 is a view, partly in section, taken along the plane of line 3—3 in FIGURE 1;

FIGURE 4 is an elevational view, similar to FIGURE 1, of a modification of the present invention as viewed along the plane of line 4—4 of FIGURE 5; and FIGURE 5 is a cross-sectional view taken on the plane of line 5—5 of FIGURE 4.

Referring now to the drawings, the numeral 1 refers to a housing enclosing the transmission, said housing having side walls 2, 3 and means forming an oil sump 4 adjacent the bottom thereof. A plurality of shafts are journalled for rotation in the side walls of the housing, said shafts including an input shaft 6, a reverse idler stub shaft 8, a countershaft 10, and a shifting gear shaft 12. Journaled for independent rotation on the countershaft 10 is the semi-final drive assembly including a sleeve shaft 13 and gears 72 and 25 adapted to transmit the drive to a conventional differential mechanism designated at D.

Secured to the upper portion of the housing 1 are a pair of axle journals 14 which support the output shafts 16 associated with the differential mechanism D. The inner ends of the output shafts 16 are splined into a pair of side gears 18 meshing with bevel gears 20 supported on a pin 21 in the differential housing 22. Bolted or otherwise connected to the differential housing is a bull gear 23 meshing with the gear 25.

Coaxially arranged around the input or drive shaft 6 is the reactor sleeve 24 of torque converter T, said reactor sleeve being fixedly mounted within an aperture in housing wall 3. The torque converter is of a conventional design comprising a plurality of rotatable vaned elements including an impeller 28, a turbine 30, and a reaction element 32 rotatable around the reactor sleeve in one direction through the one-way engaging device 34. The impeller is driven from any suitable power source through the pulley 36 connected to the hub portion of the torque converter housing. Turbine member 30 is secured to one end of the input shaft 6 and is adapted to drive the same in a manner well known to those skilled in the art.

Forward and reverse drive to countershaft 10 is supplied through a two-way clutch mechanism C which forms the subject matter of copending application S.N. 193,481 filed on May 9, 1962 by John W. Holdeman and assigned to the same assignee as the present application. It is intended that details of the Holdeman application be incorporated herein by reference. The clutch includes a central hub member 40 connected to the input shaft 6 and a pair of output shafts 42, 44 coaxially arranged with respect to said input shaft, said output shafts carrying integral drive pinions 46, 48. The latter form a part of two independent, parallel gear trains between the input shaft and countershaft 10. Pinion 46 provides forward drive by meshing directly with gear 50 on the countershaft while pinion 48 drives the countershaft in a reverse direction through reverse idler gears 54 which is in common mesh with gears 48 and 52.

Referring now to FIGURE 3, it can be seen that when the clutch is engaged to drive the left-hand drive pinion 46, the countershaft is driven in one direction; and when the clutch is engaged to drive the right-hand drive pinion 48, the countershaft 10 is driven in the opposite direction through the reverse idler gear 54 which meshes with gear 52 adjacent the other end of the countershaft.

The countershaft 10 includes first 56 and second 58 gears adapted to mesh respectively with first 60 and second gears 62 on the axially slidable cluster 64 which is splined onto shifting gear shaft 12. The right-hand driven gear 52 on the countershaft 10, associated with the reverse idler train, meshes with a pinion 68 rotatably mounted on the right-hand end of shifting gear shaft 12. When cluster 64 is shifted to the right (as viewed in FIGURE 3), the pinion 68 is received within an internal tooth gear 70 cut in the face of the shiftable gear set to obtain a third, higher speed, gear ratio.

An important feature of the present invention is the arrangement of the semifinal drive assembly which eliminates a separate shaft. As noted previously, the sleeve shaft 13, carrying gears 72 and 25, is journaled directly onto the countershaft 10. Gear 72, which meshes with splines 12a on the shifting gear shaft 12, receives the drive from the left-hand (FIGURE 3) portion of the shifting gear shaft 12, and transmits power through the semifinal drive assembly, i.e., gears 72 and 25, to the bull 23 gear on the differential housing.

Summarizing the operation, when the clutch is not in neutral, the countershaft 10 is either driven in a forward or reverse direction by drive pinion 46 or through the reverse idler 54 by drive pinion 48. Thus, the direction of the output drive may be reversed in any gear ratio by merely actuating the control rod 80 which moves the clutch into one or the other of its engaged positions. Assuming that countershaft 10 is being driven through gears 46 and 50 in a direction to yield a forward output at the axle, first gear is obtained when gears 56 and 60 are in mesh; second gear is obtained when gears 58 and 62 are in mesh and third gear is obtained when the shiftable set on cluster 64 is moved to the right to engage the matching internal and external gears 68 and 70.

Referring to FIGURES 4 and 5 of the drawings, a more simplified modification of a transmission is illustrated therein. This design employs a single ratio speed reduction unit in combination with a differential mechanism D, a two-way clutch mechanism C and a torque converter T receiving a drive from any suitable power source.

With the exception of the torque converter T, all of the elements in the system are received in a housing 100 having side walls 101, 102 onto which are secured axle journals 104.

A single countershaft 106 is journaled into the side walls of the housing, said countershaft having a plurality of gears thereon. A forward drive is obtained by actuating the left-hand clutch member driving drive pinion 108 which is continuously in mesh with driven gear 112 on the countershaft. Semifinal drive pinion 114 drives the bull gear 116 on the differential to obtain the output. Reverse drive is obtained by actuating the right-hand clutch member driving the bull gear 116 in the opposite direction through drive pinion 110, reverse idler gear 120, countershaft gear 122, and semifinal drive gear 114.

While this invention has been disclosed in connection with certain specific embodiments, it should be understood that these are by way of example rather than limitation, and it is intended that the invention be defined by the appended claims which should be given a scope as broad as consistent with the prior art.

I claim:
1. A transmission comprising an input shaft; a countershaft; a shifting gear shaft; a semi-final drive gear rotatably journalled on said countershaft; a plurality of selectively engageable gears on said countershaft and said shifting gear shaft to establish a plurality of speed ratios therebetween; a differential mechanism driven by said semi-final drive gear; additional gear means fixed to said shifting gear shaft driving said semi-final drive gear; a forward drive gear train between said input shaft and said countershaft; a reverse drive gear train between said input shaft and said countershaft; and selectively actuated clutch means for coupling said input shaft to either of said gear trains.

2. A transmission comprising a countershaft having a plurality of gears affixed thereto; a shifting gear shaft having a fixed gear and an axially slidable cluster gear, said cluster gear having a plurality of pinions cooperating with some of said gears on said countershaft to establish a plurality of drive ratios therebetween; a sleeve shaft rotatably journalled on said countershaft, said sleeve shaft carrying a first gear driven by the fixed gear on said shifting gear shaft and a second gear adapted to transmit torque to a differential mechanism; an input shaft; first and second drive pinions rotatably journalled on said input shaft; clutch means operatively connected to said input shaft, said clutch means adapted to selectively couple said drive pinions with said input shaft; means establishing a forward drive between said first drive pinion and said countershaft; and means establishing a reverse drive between said second drive pinion and said countershaft whereby said sleeve shaft may be selectively driven in forward and reverse directions in each of said drive ratios.

References Cited in the file of this patent
UNITED STATES PATENTS
3,099,165     Heth et al. _____ July 30, 1963
3,099,166     Schou _____ July 30, 1963